United States Patent Office 3,397,252
Patented Aug. 13, 1968

3,397,252
PROCESS FOR PRODUCING DIETHYLENICALLY
UNSATURATED COMPOUNDS
Frank N. Jones, Wilmington, Del., assignor to E. I. du
Pont de Nemours and Company, Wilmington, Del., a
corporation of Delaware
No Drawing. Filed July 25, 1966, Ser. No. 567,389
10 Claims. (Cl. 260—680)

This invention relates to a novel process for producing diethylenically unsaturated compounds.

This invention is directed to a novel process for the reductive coupling of vinylic, allylic, substituted vinylic and substituted allylic compounds to produce 1,3-butadiene, 1,5-hexadiene, substituted 1,3-butadienes and substituted 1,5-hexadienes, respectively. The process comprises the reaction of a mixture of a stannous salt and a salt of a metal selected from the platinum or palladium groups of metals of the Periodic Table of Elements [1] with a halogen-containing compound of the formula

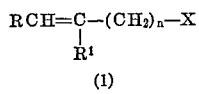

(1)

wherein R is selected from hydrogen, alkyl, cyano, cyanoalkyl, cycloalkyl and aryl; $R^1$ is selected from R and halogen; X is halogen and $n$ is a cardinal number selected from 0 to 1; with the proviso that $R^1$ cannot be halogen when $n$ is 0.

The process of this invention is conducted in a solvent or mixture of solvents capable of dissolving at least some of the stannous salt and some of the salt of the metal of the platinum or palladium group used. It is preferred that the solvent or solvents used in this process are chemically inert to the reactants and products. The reaction is conducted at a temperature of generally not over 200° C. and usually temperatures of less than 150° C. are used. It is convenient to run the process at ambient temperatures. Temperatures of about 0° C. can also be used.

An alkali metal fluoride added to the reaction mixture increases the rate of reaction between the stannous salt and the halogen-containing olefin. Alkali metal fluorides which cause the increase in rate of reaction include sodium fluoride, potassium fluoride, rubidium fluoride and cesium fluoride. A preferred process embodiment of this invention includes the reaction mixture containing an alkali metal fluoride.

Halogen-containing compounds which can be coupled are represented by Formula 1 given above. The R group in the formula can be hydrogen: alkyl and cycloalkyl each containing up to 10 carbons; cyanoalkyl containing 2–5 carbons and aryl of up to 10 carbons. $R^1$ can be fluorine, chlorine, bromine and iodine. X is selected from fluorine, chlorine, bromine and iodine. These compounds can be easily prepared by methods reported in the chemical literature. [See Synthetic Organic Chemistry, R. B. Wagner and H. D. Zook, John Wiley and Son, Inc., New York (1953) pp. 88–147.] Included among the vinylic and allylic compounds suitable for this process are β-bromostyrene, α-chlorostyrene, 2-α-naphthyl - 1-chloro-ethylene, 1-chloro-1-decene, 1-bromo-1-butene, 1-chloro-1-hexene, 1-chloro-1-cyclohexene, β-chloroacrylonitrile, 2-bromo-1-butene, allyl chloride, allyl bromide, allyl fluoride, allyl iodide, methallyl chloride, methallyl bromide, methallyl iodide, 1-cyano-2-chloro - 1-propene, 3-phenyl - 2-chloropropene, 3-α-naphthyl-2-chloropropene, crotyl chloride, crotyl bromide, 1-cyano-3-chloro-1-propene (cis and trans) and 1-chloro-4-cyano-butene-2. In general, it is preferred that the halogen substituent of the compound being coupled is chlorine or bromine, although fluorine can also be used.

Solvents employed in the process of this invention include those which can dissolve the inorganic metal salts and the halogen-containing compound, e.g., generally 0.01% or more by weight of the inorganic salts based on the weight of the solvent. These solvents must be capable of dissolving the reactants and at the same time be non-reactive with the reactants or product. The most useful solvents are the relatively low molecular weight organic compounds having multiple valence bonds between two adjacent dissimilar atoms. Included among the solvents that can be used in the process are: nitriles such as acetonitrile and propionitrile, substituted amides such as N,N-dimethylformamide, N,N-dimethylacetamide, N,N-diethylformamide, N-methylpyrrolidone and N,N-diethylacetamide; sulfoxides such as dimethyl sulfoxide and sulfones such as dimethyl sulfone and tetrahydrothiophene-1,1-dioxide (sulfolane). These solvents can be used either neat or in the presence of other solvents such as lower alkanols for example, methanol or water. These solvents are used in an amount of up to 50% of the total weight of solvent present. It is preferable that the latter solvents be present only to an extent of, at most, a few percent, e.g., 5%. In some cases, when water is used to the extent of about 2%, an increase in the yield of product is obtained. Inert diluents or solvents such as hydrocarbons also can be used in the reaction.

The stannous compounds used in this process include stannous chloride, stannous bromide and stannous salt complexes such as lithium trichlorostannite and tetraalkylammonium trichlorostannite. It is preferred that the process be conducted with a mole ratio of stannous salt to the halogen-containing compound of about 1:1. Good yields of product are obtained when the mole ratio is 2:1–4:1 or higher. Some product is obtained when the mole ratio is 0.5:1 or lower. Stannic compounds which are produced by the process of this invention can be reduced with hydrogen and other reducing agents to give stannous salts which in turn can be used for further reaction with the halogen-containing compound.

Salts of metals of the platinum and palladium groups which are catalysts in this process include compounds such as alkali metal salts of $PtCl_4^{--}$ and $RhCl_6^{---}$. Compounds, such as $IrCl_3$, $Na_3IrCl_6$, $PdCl_2$, organometallic coordination compounds of Pt(II) and the complex $[(C_2H_5)_4N]_4Sn_8Pt_3Cl_{20}$ can also be used in this process. The mole ratio of the stannous salt to the palladium or platinum metal salt used can be 500:1 to 30:1. Higher yields of product are obtained when the mole ratio is 6:1 or lower. A mole ratio of 3:1 is preferred. Salts of metals having atomic numbers 44, 45, 46, 76, 77 and 78 can be used as the catalyst in this process.

The rate of reaction of the process is dependent upon the temperature of reaction, the mole ratio of stannous salt to halogen-containing compound and the mole ratio of stannous salt to palladium or platinum metal catalyst used in the reaction. Temperatures as low as 0° C. can be used. Yields and conversion increase with temperatures of up to 100–150° C. Pressure reactors may be necessary at these higher temperatures to prevent loss of the halogen-containing reactant, solvents and product. The time of reaction can vary from a short time of a few minutes to 3 or 4 days. Shorter times are preferred and can be obtained by a proper choice of conditions and temperature.

An induction period is sometimes observed. The induction period is the time period measured from the time the reactants have been mixed together until reaction occurs. The induction period can be of short time to 3 or 4 hours.

[1] Periodic Table set forth in Deming's General Chemistry, John Wiley and Son, Inc., New York, 5th edition, Chapter 11.

The product is isolated from the reaction mixture by distillation and/or extraction. The products can be purified using the preparative organic technique of distillation.

The following examples further illustrate the invention.

Example I.—Butadiene from vinyl chloride

In a 150-ml. Kjeldahl flask having a ball-joint, was placed 1.5 g. (5.65 mmoles) of platinous chloride, 4.0 g. (0.0113 mole) of tetraethylammonium trichlorostannite, 5 g. of cesium fluoride, 12 ml. of N,N-dimethylformamide containing 2% water, 0.01 g. of hydroquinone and a magnetic stirring bar. The flask was attached to a vacuum-train having a manometer; the total volume was 240 ml. The system was quickly evacuated to a pressure of 2 mm., and vinyl chloride (300 ml. at 498 mm. and 25°., 0.0134 mole) was condensed into the reaction flask. The red mixture was stirred at ambient temperature using a magnetic stirrer. The pressure in the system did not change for 3 hours. It then fell steadily for 15 hours and more slowly for 15 hours more. After 40 hours, the product gas mixture was distilled from the solvent. It occupied 330 ml. at 246 mm. and 25° C. Gas chromatography showed this gas to be 98.8% butadiene, 0.5% air, 0.1% diethyl ether and traces of other gases, including vinyl chloride. Thus, the conversion was 97%. The infrared spectrum of the gas confirmed that this analysis was substantially correct.

When the above process was repeated except that no platinum was present, no butadiene was obtained. When platinum alone was present, only a trace of butadiene was formed.

Tetraethylammonium trichlorostannite as used above was obtained as follows: Warm and clear solutions of 22.6 g. (0.1 mole) of fresh stannous chloride dihydrate and of 16.6 g. of tetraethylammonium chloride in the minimum amounts of 0.5 N HCl were thoroughly mixed. The mixture was cooled to 0° C. to complete crystallization of the product. The product was collected, dried at a pressure of 1 mm., and recrystallized by slow addition of ether to a filtered solution in ethanol to give 23.0 g. (65%) of product, M.P. 78–78.5° C. The solid and its solutions decompose slowly in air.

Examples II–XIII.—Butadiene from vinyl chloride

Using the general procedure of Example I with different tin to platinum ratios for a time of about 18 hours, the following table shows results obtained. Yield is based upon the moles of halogen-containing compound consumed and conversion on moles of halogen-containing compound introduced.

| Example | Molar Ratio, Sn:Pt | Solvent | Temp., °C. | Conversion to $C_4H_6$, percent | Yield of $C_4H_6$, percent |
|---|---|---|---|---|---|
| II | 2:1 | $CH_3CN$ | 25 | 88 | 88 |
| III | 3:1 | $HCON(CH_3)_2$ | 25 | 82 | 85 |
| IV | 8:3 | $HCON(CH_3)_2$ | 25 | 82 | 85 |
| V | 4:1 | $HCON(CH_3)_2$ | 25 | 77 | 89 |
| VI | 5:1 | $HCON(CH_3)_2$ | 25 | 55 | 85 |
| VII | 6:1 | $HCON(CH_3)_2$ | 25 | 20 | 71 |
| VIII | 7:1 | $HCON(CH_3)_2$ | 25 | 5 | 31 |
| IX | 30:1 | $HCON(CH_3)_2$ | 77 | 9 | 48 |
| X | 4:1 | $(CH_3)_2SO$ | 25 | 43 | 70 |
| XI | 4:1 | $(CH_3)_2SO$ | 65 | 69 | 91 |
| XII | 3:1 | $4/1\ HCON(CH_3)_2/H_2O$ | 25 | 31 | 75 |
| XIII | 3:1 | $1/1\ CH_3CN/H_2O$ | 25 | 2 | 8 |

Example XIV.—Butadiene from vinyl chloride

The general procedure of Example I was repeated except that no cesium fluoride was present. With a Sn:Pt ratio of 4:1 at 70° for 17 hours, a conversion to butadiene of about 20% resulted. At a ratio of 3:1 at 25° for 600 hours, a 40% conversion at 92% yield was obtained.

Example XV.—Butadiene from vinyl chloride

When the general procedure of Example II was repeated except that the ratio of Sn:Pt was 4:1 and cesium chloride was used in place of the fluoride, a conversion to butadiene of about 9% was obtained. With sodium fluoride, the conversion was 45%.

When stannous chloride and lithium trichlorostannite were used, conversions of about 16–24% were obtained.

Example XVI.—Butadiene from vinyl chloride

When the general procedure of Example V was repeated except that the platinum salt was potassium chloroplatinite, the conversion was 84%. With potassium rhodiohexachloride, a conversion and yield of 9% resulted at 85° C.

Example XVII.—Butadiene from vinyl fluoride

Substitution of vinyl fluoride for vinyl chloride in the general process of Example III gave 35% conversion and 36% yield of butadiene; on increasing the time to 96 hours, 56% conversion resulted. Higher conversions resulted when the Sn:Pt ratio was 3:1 with 2% water in the dimethylformamide.

Example XVIII.—1,4-diphenylbutadiene from β-bromostyrene

A mixture of 2.0 g. (7.5 mmoles) of platinous chloride, 8.0 g. (0.0226 mole) of tetraethylammonium trichlorostannite, 8.3 g. (0.045 mole) of β-bromostyrene, about 5 g. of cesium fluoride, a trace of hydroquinone and 25 ml. of anhydrous dimethylformamide was stirred in a nitrogen atmosphere at 135–140° C. for 18 hours. The solvent was distilled at 60° C. and 0.1 mm. The residue was extracted with ether. The extract was concentrated and recrystallized from a mixture of benzene and ethanol to give, in two crops, 1.14 g. (25%) of 1,4-diphenylbutadiene, M.P. 151–152° C. Corson, Org. Syntheses, Coll. vol. II, 229 (1943), gives M.P. 152.5–153.5° C.

Example XIX.—2,3-diphenylbutadiene from α-chlorostyrene

The general procedure of Example XVIII was repeated except that α-chlorostyrene [Dufraisse et al., Bull. Soc. Chim. France, 37, 874 (1925)] was used and the reaction was effected in refluxing propionitrile (B.P. 97° C.). An extract of the 2,3-diphenylbutadiene in chloroform was treated with bromine to give a derivative capable of easy purification. Recrystallization of the latter from a mixture of chloroform and hexane gave 0.60 g. (11% overall) of 1,4-dibromo-2,3-diphenyl-2-butene, M.P. 144–144.5°, reported, M.P. 144–147° [C. F. H. Allen et al., Can. J. Chem., 17B, 75 (1939)].

Example XX.—1,5-hexadiene from allyl chloride

Essentially the procedure described in Example I for the reaction with vinyl chloride was used except that the allyl chloride was introduced as a liquid. The reaction mixture was stirred for 72 hours at 25° C. Gas chromatography showed that about 50% of the allyl chloride had been converted to 1,5-hexadiene.

Example XXI.—1,4-dicyanobutadiene from β-chloroacrylonitrile

Repetition of the general procedure of Example I except that β-chloroacrylonitrile was used gave 1,4-dicyanobutadiene. Hydrogenation of the latter with a platinum catalyst gave adiponitrile.

Example XXII.—2,5-dimethyl-1,5-hexadiene from methallyl chloride

Essentially the procedure of Example I was used except that the methallyl chloride (2.5 g., 0.028 mole) was introduced as a liquid. The reaction mixture was stirred for 16 hours at 75–78° C. Analysis of the distilled product mixture by gas chromatography gave 0.39 g. of 2,5-dimethyl-1,5-hexadiene corresponding to 25% conversion and in addition about 10% of other isomers of dimethylhexadiene. Structure was confirmed by mass spectroscopy.

In addition to the reactions as specifically described in the examples, the use of a mixture of ethylenically unsaturated halides, i.e., vinyl or allylic halides, can be used to give a mixture of products. For example, a mixture of allyl chloride and vinyl chloride can give 1,4-pentadiene as a product.

The products of this invention are used to produce polymers, copolymers, terpolymers and the like. 1,3-butadiene can be homopolymerized or copolymerized to produce high polymers which are elastomeric in nature and which are useful for the production of elastomeric products. 1,5-hexadiene is useful for the production of ethylene/propylene/1,5-hexadiene and terpolymer which is an elastomeric rubber. These and the other dienes produced by the process of this invention can be used to produce polymers from which hard, rigid solids, elastomeric solids and films can be produced.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. Process for producing a diethylenically unsaturated compound comprising reacting a stannous salt in the presence of a salt of a metal of the platinum or palladium group of metals of the Periodic Table with a halogen-containing compound of the formula

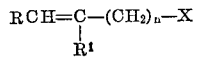

wherein R is selected from hydrogen, cyano, cyanoalkyl, cycloalkyl and aryl, $R^1$ is selected from R and halogen, X is halogen and $n$ is a cardinal number selected from 0 to 1; with the proviso that $R^1$ is not halogen when $n$ is 0; said process conducted at a temperature of 0 to 200° C. in a solvent or mixture of solvents capable of dissolving, at least in part, the salts and halogen-containing compound; and thereafter isolating the product.

2. Process of claim 1 wherein the solvent is selected from the group consisting of N,N-dimethylformamide, N,N-dimethylacetamide, acetonitrile, propionitrile, N-methylpyrrolidone, dimethyl sulfoxide, a mixture of one of these solvents and up to 50%, by weight, water and a mixture of one of these solvents and up to 50%, by weight, of a lower alkanol.

3. Process of claim 1 wherein the salt of the metal of the platinum group is platinous chloride.

4. Process of claim 1 wherein an alkali metal fluoride is added to the reaction.

5. Process of claim 1 wherein the halogen-containing compound is vinyl chloride.

6. Process of claim 1 wherein the halogen-containing compound is allyl chloride.

7. Process of claim 1 comprising reacting, in N,N-dimethylformamide containing 2%, by weight, water, tetraethylammonium trichlorostannite, cesium fluoride and platinous chloride with a halogen-containing compound of the formula

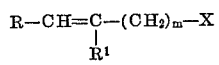

wherein R, $R^1$ and X are as defined in claim 1.

8. Process of claim 1 wherein the stannous salt is stannous chloride.

9. Process of claim 1 wherein the mole ratio of stannous salt to the compound of the formula

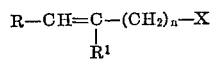

is up to 2:1 and the mole ratio of stannous salt to the salt of a metal selected from the platinum or palladium group of metals of the periodic Table is up to 30:1.

10. Process of claim 1 wherein the halogen-containing compound is methallyl chloride.

References Cited
UNITED STATES PATENTS

| | | | |
|---|---|---|---|
| 1,884,002 | 10/1932 | Leyes | 260—680 |
| 2,755,322 | 7/1956 | Rust et al. | 260—680 |
| 2,899,473 | 8/1959 | Leprince et al. | 260—677 X |

PAUL M. COUGHLAN, Jr., Primary Examiner.